United States Patent [19]

Haas

[11] 4,357,535
[45] Nov. 2, 1982

[54] APPARATUS FOR INSPECTING HAND-HELD ARTICLES AND PERSONS CARRYING SAME

[75] Inventor: David J. Haas, Suffern, N.Y.

[73] Assignee: North American Philips Corporation, New York, N.Y.

[21] Appl. No.: 145,151

[22] Filed: Apr. 30, 1980

[51] Int. Cl.³ .................... G01N 23/00; G21F 3/02
[52] U.S. Cl. .................................... 378/57; 324/226; 378/95
[58] Field of Search ............... 250/358 R, 359, 312, 250/515, 416 TV, 492 R, 485, 519, 360; 324/58.5 A, 234, 226; 340/572, 551, 552, 561; 358/111

[56] References Cited

U.S. PATENT DOCUMENTS 3,678,278 7/1972 Peil .............................. 250/358 R
4,020,346 4/1977 Dennis ......................... 250/358 R

FOREIGN PATENT DOCUMENTS 1112620 11/1966 U.S.S.R. ..................... 324/58.5 A

*Primary Examiner*—Alfred E. Smith
*Assistant Examiner*—Carolyn E. Fields
*Attorney, Agent, or Firm*—Paul R. Miller

[57] ABSTRACT

An inspection system is provided to simultaneously X-ray inspect hand carried articles and provide metal detection of the person of the carrier. These different inspections are independent, and may be carried out separately from one another. The X-ray inspection involves the insertion of a hand carried item into a chamber, and guiding it along the X-ray inspection station by holding a handle outside of the detector. Metal detection of the person may be accomplished independently by walking through a metal detector arch.

26 Claims, 16 Drawing Figures

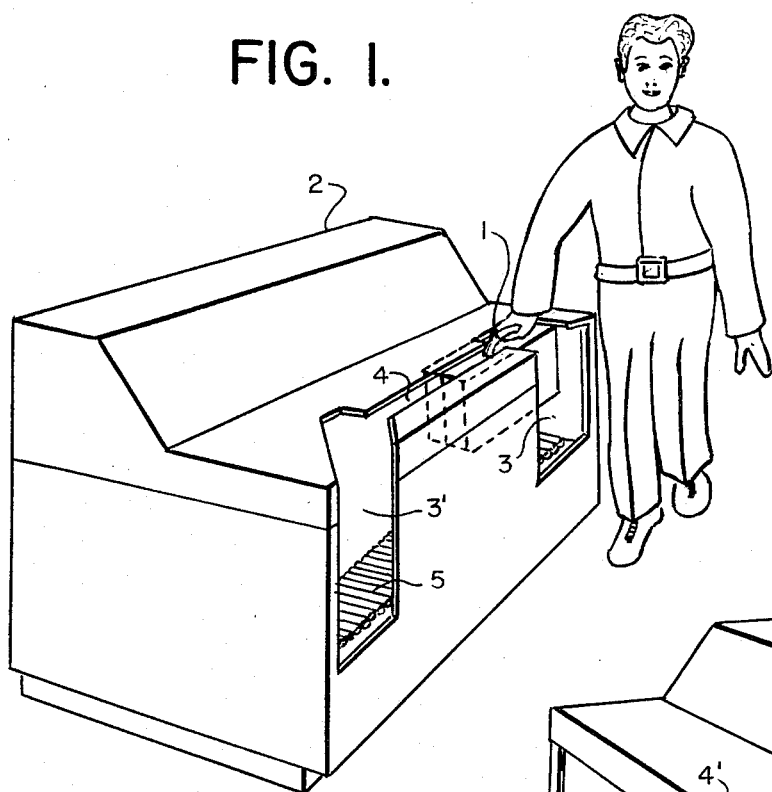
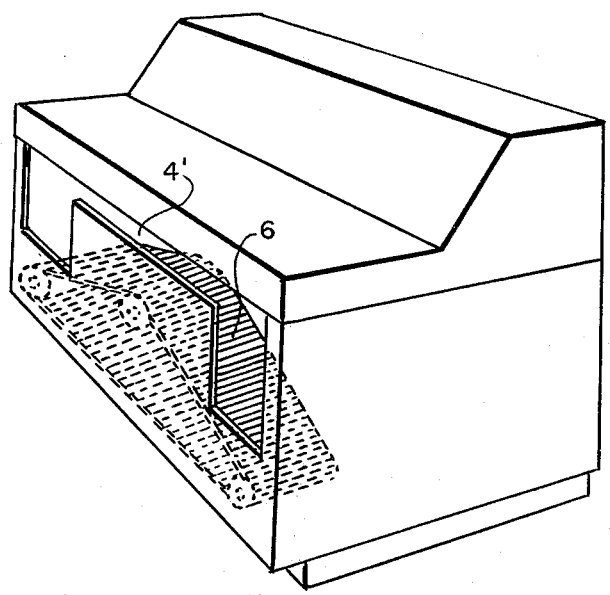
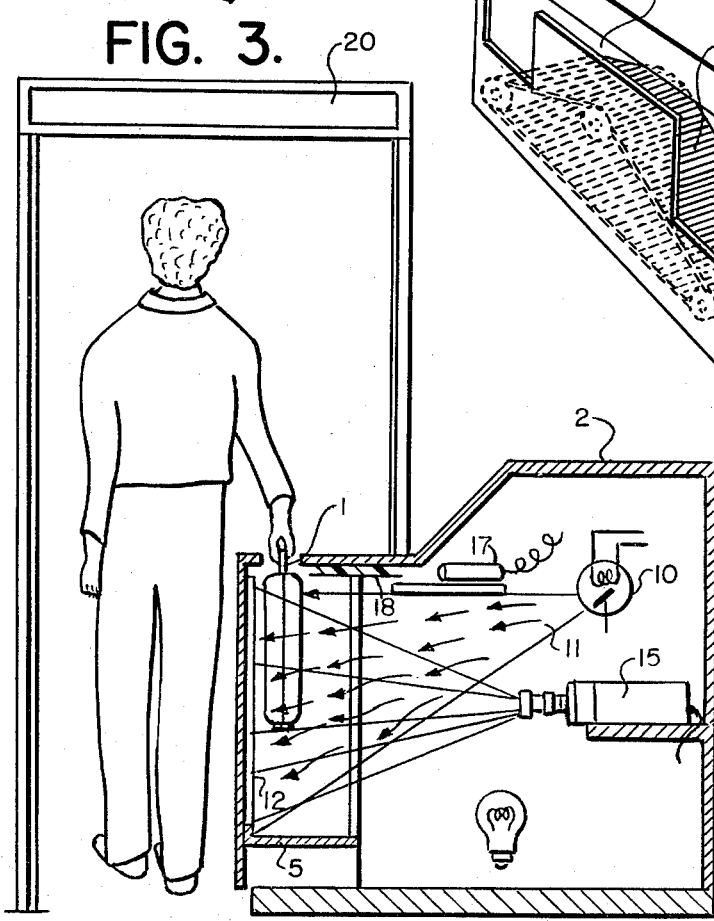

APPARATUS FOR INSPECTING HAND-HELD ARTICLES AND PERSONS CARRYING SAME

The present invention relates to systems for electronic inspection of articles carried by hand, as well as for inspection of persons carrying such articles. More particularly, the invention involves X-ray or other radiation systems for inspecting the hand-held articles without harm to the person carrying such articles, while such person may be also inspected, or at least be independently inspected, for possession of metal objects by other sensors.

The use of X-ray systems to inspect luggage of airline passengers, for example, has been in use for a considerable period. Moreover, such apparatus are now required by federal standards for use in connection with airline facilities. All of these prior arrangements involve the separation of baggage from persons, and the subsequent, picking up of the articles by the persons carrying same. This separation persists whether or not such person is independently inspected for possession or carrying of weapons and other dangerous metal objects.

The present invention, on the other hand, allows a continuous hand-carrying of articles through an inspection system even though the person may be simultaneously inspected for possession of other objects on his person. Thus, the present invention enables the inspection of both the person and his hand-carried articles at the same time with different inspection techniques and requirements being utilized.

The arrangement of the present invention are particularly important since they not only rely on airline inspection of persons and their hand-carried items for dangerous materials, but also are useful in security arrangements for factories, offices, government facilities, and etc., as well as for stolen materials. Importantly, the requirements of the present invention are such that the person carrying hand-held articles need not be separated from the article during inspection of both the person and the article, as is the current requirement in airport inspections, for example. In addition, each of the functions may be operated independently of one another, and provide a full mode of protection to users. In this regard, hand-held articles may be inspected without involving the persons of the people carrying such articles, while such persons may be inspected for dangerous metal articles without involving the hand-held items.

The benefits of the present invention may be achieved by the use of an X-ray facility in a cabinet with a longitudinally extending slot along one edge thereof and adjoining entrance and exit areas. Persons carrying articles may then insert the article through the entrance opening into the cabinetry of the device and guide it along the longitudinal slot within the cabinet to the exit opening. While the article is within the cabinet, an X-ray inspection of the article is carried out in accordance with the present invention. The X-ray source and the detection of the X-irradiated article are achieved at only one side of the apparatus, for example.

As the hand-held article is carried along the longitudinal slot in the cabinetry, an X-ray beam strikes the article, and a silhouette image of the X-irradiated article is visually perceived. In accordance with the present invention, a visual image of the article may then be made by way of a TV image, and at the same time, the visual image can be stored for later viewing by an inspector.

This arrangement of a hand-held X-ray security screening system is practical by involving proper human engineering and X-ray protection for the person carrying the article being examined. Because of human factor designs when the X-ray chamber is no more than six to twelve inches away from where the person stands, it is necessary to provide the X-ray imaging system for viewing the image in an area that is physically at the same side of the X-ray chamber as the X-ray generator. This requires either a storage X-ray screen at the same side as the X-ray generator for viewing the image, or an electronic scanning storage system for image retention and ultimately a real time continuous beam X-ray imaging system for viewing the article being X-rayed by the X-ray generator.

There are generally four possibilities for X-ray imaging systems for hand-held articles in such security screening systems. A first of these include a chemical or electrical X-ray image system where the X-rays impinging through the article are exposed on an X-ray sensitive screen with the image being retained and viewed from the X-ray generator side after the inspected article is removed. This type of screening can either be an electrochemical X-ray sensitive screen or an electrophoretic type screen. These types of screening enable an active image storage. Fluorescent types of screens represent a passive type of energy storage whereby the X-ray image is stored electronically by means of a television system.

A second alternative is to use a flying spot scanning device where the X-ray beam is scanned vertically along a large scintillating crystal such as a sodium iodide crystal, and the X-ray intensity is measured as a function of time as the beam scans vertically. Such systems are known in principal, and provide a low scatter property, as well as an image storing mechanism, since the image is stored as the beam scans vertically where the article to be inspected is carried horizontally. The primary disadvantage of this type of system with respect to the present invention is that the article is not transported in a uniform manner (such as on a conveyor belt) which is the manner is which the system is designed to operate, but is being hand-carried. This will distort the X-ray scanning rate with a non-linear velocity, and therefore, cause distortion in the X-ray image.

A third imaging mechanism may be achieved by a fan beam of X-rays used in a vertical plane with the detectors representing a series of photosensitive solid state devices such as phototransistors. A series of phototransistors in a vertical array with the fan beam of X-rays impinging thereon would be able to produce an X-ray image in the vertical plane as the article is transported horizontally between the fan beam and the photodetectors. The X-ray attenuation change will be recorded and an X-ray image stored for television presentation. The fan beam has substantially more X-ray scatter than does the flying spot scanner pencil beam, and also suffers from the same transporting uniformity problems in that a person would not necessarily carry the bag at a uniform linear speed or on the same horizontal plane.

A fourth alternative to the X-ray imaging system would be a continuous beam imaging X-ray system where a fluorescent screen faces toward the X-ray generator. By interposing a mirror between the article being X-rayed and the fluorescent screen, which is an X-ray transmissive screen such as described in U.S. Pat. No. 4,052,621, a visual image of the fluorescent screen can be obtained so that the X-ray image is presented.

Of these four alternative systems, the first is viewed as providing significant and distinctive advantages, particularly with use of electrophoretic type screens. In such an arrangement, pulsed X-ray exposures are generated to obtain a "snap-shot" of the hand-held article in one position. Short pulsed techniques are desirable, and especially pulses of 40 nanoseconds are found to be advantageous.

While all of these four systems could be made to be functional, they represent a similar problem of X-ray scattering. Because the person's hand is so relatively close to the X-ray detector, X-ray scatter will have to be kept to a minimum in order to meet federal requirements for X-ray protection of the public. This means that the X-ray scatter to the holders hand from a fluorescent screen and the object being held in the X-ray detection device hand must be less than 0.5 milliroentgens per hour at 2 inches from the cabinet itself. It appears practical for containing X-ray scatter, or maintaining shallow angle scattering, from within the cabinet to use a honeycomb or grill material which is lead coated so that the X-rays impinging upon the absorbing surface of the cabinet are trapped within the honeycomb cells themselves. This unique beam trapping type material could also be molded and used behind the imaging screen structure and in the cabinet walls.

Such an X-ray absorber could be made as a honeycomb material out of aluminum, paper or plastic with cells of the order of 2 to 20 millimeters across such that the open area of the cell is large compared to the edge thickness of the wall of the material itself. This honeycomb could be sprayed or dipped into lead or other high X-ray absorbing material, such as tin or zinc, in such a manner that it becomes a long collimator trap for the X-ray beam itself. The absorber can then be placed on the internal cabinet surfaces so that when the X-ray beam impinges upon the absorber, the X-ray beam is trapped and not scattered at substantial angles. It will be scattered back along the collimator direction resulting in a reduction of side scatter in order to reduce cabinet X-ray leakage to an acceptable level.

Importantly, the X-ray protection barrier for a cabinet type X-ray system in accordance with the present invention allows X-ray scatter protection in a vertical plane such that a movable support, as a hook, hangar or strap, supporting an item to be X-rayed, can be transported through the system by hand with an intervening flexible barrier. The flexible scatter barrier is intended to be attached to the cabinet so that the transporting movement is from one side of the cabinet to the opposite side of the cabinet, transporting the objects horizontally through the X-ray beam in a vertical plane, yet preventing X-rays from being scattered out of the cabinet up through the vertical plane.

While previous barriers were utilized in the transport of items along a horizontal plane, such as conveyor belt, the aspects of the present invention exist in that the article to be X-rayed moves along a vertical plane and the barriers must prevent scattering in this direction. The problem is to avoid sagging of the flexible barriers or curtains in the vertical direction as a result of gravity and weakening by wear.

This fundamental concept of the present invention is achieved by providing the flexible barrier to be X-ray absorbing fibers that are interdigitized yet self supporting. These X-ray absorbing fibers are attached to each side of the longitudinal slot or opening in such a manner to prevent X-rays from passing through the opening.

When a vertical support structure, such as a hook, strap, rope or other device passes along the slot, the X-ray absorbing fibers will separate permitting the vertical supporting device to pass therealong, but in turn, immediately reposition themselves and close the opening after the vertical support was moved. Such fibers may simply be round stiff fibers protruding from each side of the slot and overlapping in the center, while on the other hand, the fibers can be elliptical and thereby more flexible in the horizontal plane than in the vertical plane without a tendency to sag. In addition, the fibers may be convoluted blades preventing X-ray beam scattering in the vertical plane by a mutual overlap of non-linear curved surfaces.

The relative X-ray absorption properties of these flexible barriers can be determined by the size of the fibers themselves, the quantity of the fibers present in the barrier, the X-ray absorbing materials in the fibers, and their relative distance from the X-ray source itself. A fundamental parameter of the flexible barrier is the resistance to movement of the vertical support device therethrough. This resistance must be relatively small in order not to provide an inhibiting factor for the use of the barrier, but also must provide adequate radiation protection by resisting sagging, deformation and damage due to frequent use.

A further aspect of the present invention resides in the presence of a conveyor type system below the longitudinally extending slot in order to transmit dropped articles, or to move extra items being carried by the person. In the X-ray inspection system of the present invention, an additional X-ray source may be provided to scan such articles on the conveyor system. This enables a full coverage of the area of transmittal of articles in the structure, whether by way of hand-carrying or conveyor carrying.

The metal detector device for examining persons may be integrated with the X-ray structure in such a way that the hand-held article is magnetically and electrically shielded by the X-ray cabinetry. Metal detection of the person passing through the metal detecting device can then be carried out independently of items in the hand-held article since the X-ray cabinetry acts as a shielding structure. This arrangement allows a person to be isolated from hand-carried items, but yet maintain possession of such items.

Since metal detection of the person passing through the device may be carried out independently of X-ray examination of the hand-held article, then such metal detection may occur without use of the X-ray detector. That is, the hand-carried items may be inserted into a screening protective system while the carrier passes through the metal detector. In this manner, normally hand-carried items which cannot be carried through metal detectors because they contain too much metal, such as compacts, lipsticks, keys, etc., can be shielded while a person is passing through the metal detector.

This structure resides in an arrangement in which a barrier being blind to the metal detector field has a shielded slot through which a person inserts and carries items independently of the metal detector. That is, such items may be accommodated in a separate compartment which prevents actuation of the metal detector, yet allows the person to proceed through the metal detector without having to give up posession of the articles or to pass such articles around the detector.

As a result of this arrangement, not only may the shielded compartment or slot be utilized in an X-ray machine providing X-ray imaging of the article that is hand-transported, but a visible light TV camera may look at the articles being carried through the shielded slot if the hand transported article is visible. That is, at many security locations, clear plastic bags are provided in which articles are carried into and out of restricted areas. By being able to carry wallets, keys, etc. in such clear plastic bags, a person can enter or leave restricted areas without difficulty inasmuch as the articles in the clear plastic bag are inspected by way of TV, for example, while the person independently walks through the metal detector. The important aspect of this is that the person can maintain possession and carry these items without having to pass them separately around the metal detector.

Accordingly, an important feature of the present invention resides in the fact that articles can be X-ray inspected even though held in the hand of the owner.

In addition, a further aspect of the present invention exists in that a hand-held article can be X-ray inspected, while at the same time the owner can be independently examined for metal by way of an adjoining metal detector.

Also, an important aspect of the present invention exists in that a person can pass through a metal detector carrying articles which may be independently passed through the metal detector without operating the metal detector.

The features of the present invention may be achieved by the self transport of an article by its owner through an article inspection device and/or a person inspection device wherein the article and its owner are not separated. This results in a faster screening of the article, the elimination of guards and personnel at the screening apparatus, the maintenance of all property by an individual, the elimination of substantially moving parts, the ending of spillage of article contents, the maintenance of article ownership identification, and the lack of intimidation occuring with earlier inspection systems.

In addition, the present invention allows an X-ray examination of hand-held articles with independent metal detection of persons wherein suspicious and improper articles automatically sound alarm detectors. Further, the automatic operation in this arrangement merely involves a simple turn-on switch, or key switch, without control or adjustment for operation. In addition, the X-ray images and/or the metal detector alarm arrangements can be automatically recorded on video tape.

The simultaneous arrangement of X-ray and metal screening allows two operations to be carried out in one screening process without interference between the hand-carried articles and the metal detector. This arrangement allows such metal articles as keys, jewelry, etc. to be carried without exposing the carrier to unfortunate metal detection related to the carrying of weapons. The arrangement of the present invention allows individuals to proceed at their own pace without throughput speed restrictions, while a single file is naturally formed. Moreover, all screening information can be recorded for delayed viewing and guard viewing consoles can be located elsewhere. The arrangement of the present invention allows operation in both directions and can be located for both right- or left-handed operation.

While the arrangements of the present invention allow a security screening system having a higher throughput than conventional conveyor transports, conveyor systems may be utilized in the present invention in order to transport odd shaped articles and articles without hand search and to remove articles dropped through the slot from the X-ray chamber. Such a conveyor system can also be operated in either direction.

FIG. 1 is an illustration of one arrangement of the X-ray assembly in accordance with the present invention;

FIG. 2 is an illustration of another alternative arrangement for the invention of the present invention;

FIG. 3 shows a partially cross-sectional arrangement of the X-ray and metal detection assemblies of the present invention;

Figure 8A:
FIG. 8a shows in cross-section a fiber covering for the slot of the X-ray apparatus.
Figure 8B:
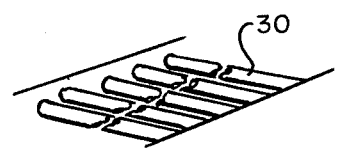
Figure 8C:
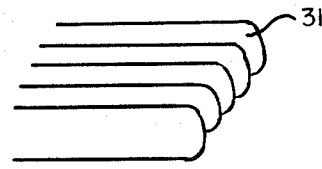
Figure 8D:
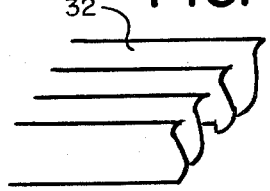
Figure 8E:
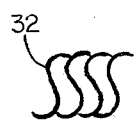
Figure 8F:
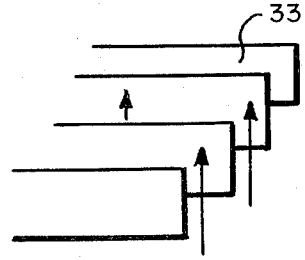
Figure 9:
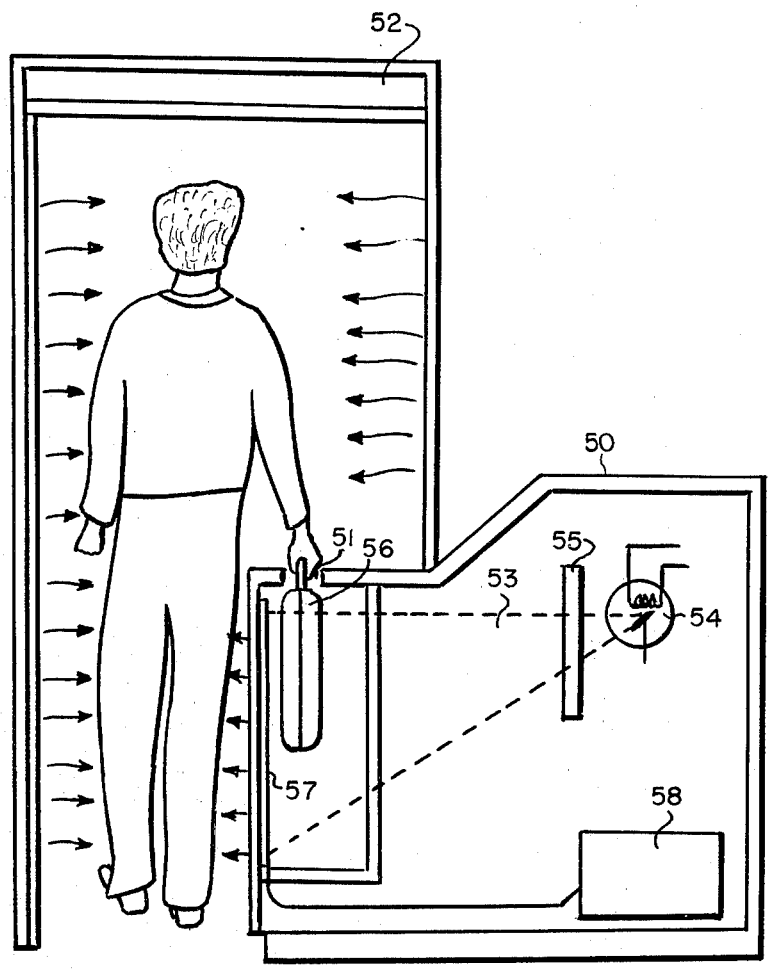

FIG. 8b partially illustrates the arrangement of one embodiment of covering of the X-ray slot;

FIG. 8c illustrates a further arrangement of the covering material for the X-ray slot;

FIG. 8d illustrates another arrangement of the covering material for the slot;

FIG. 8e illustrates in cross-section the arrangement of FIG. 8d;

FIG. 8f shows a partial illustration of an additional arrangement of the covering material for the slot of the X-ray apparatus; and FIG. 9 shows another arrangement using the X-ray absorption principle.

The X-ray system for hand-held articles may be seen by reference to FIG. 1. In this arrangement a hand-held article 1 is carried by a person who introduces it into the entrance opening 3 and holds onto the handle of the hand-held article. By passing it along the longitudinal slot 4 with the handle held above the surface of the X-ray machine 2, then exit may be at the other end 3'. A conveyor system 5 runs along the bottom of the cabinet 2 in order to carry through any items which may be dropped accidentially by the person, or to carry items which are not desired to be carried by such person.

Figure 1A:
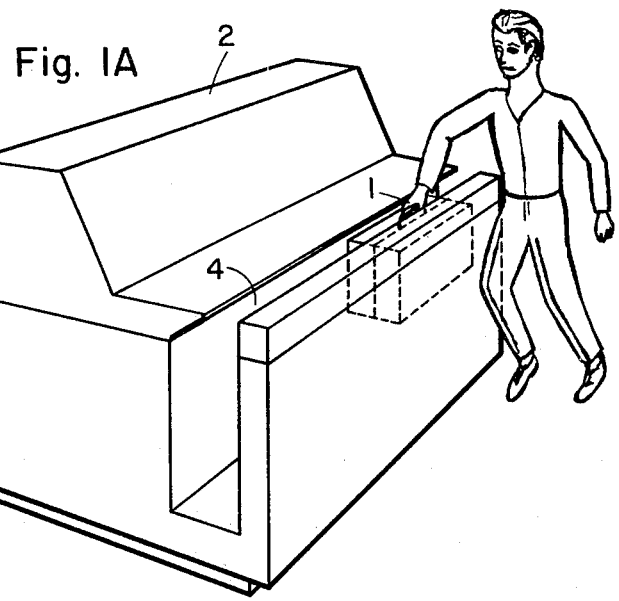
FIG. 1A is an illustration of an alternative arrangement of the X-ray assembly of FIG. 1.

FIG. 1A shows an X-ray cabinet assembly where the entrance and exit openings are at the end walls of the machine.

The internal arrangement of the X-ray inspection device of this invention may be seen by reference to FIG. 3 in which the X-ray tube 10 produces pulsed, low scattered X-rays which penetrate the article in the mid-position of the chamber and is exhibited on the screen system 12 which may be electronic by way of being fluorescent, electrochemical, or electrophoretic, for example. The articles may be purses, briefcases, lunch-pails, or etc. The image on the screen is viewed by way of a video system 15 producing an image, as well as providing storage tape for storing the image of the item.

The small conveyor system 5 provided at the bottom of the X-ray chamber may be approximately 12 inches wide, for example. This conveyor device 5 removes dropped articles from the X-ray chamber or transports articles through the X-ray chamber that are dropped while being carried in the slot, items that do not have handles, or articles that belong to individuals carrying more than one article at a time.

The internal walls of this structure may be shielded for prevention of X-ray exposure outside the cabinet. Such shielding material, such as 18 shown in partial form in FIG. 3, may include use of lead, tin, etc. for absorbing X-rays.

In addition, a honeycomb material, made out of aluminium, paper, or plastic with cells of the order of 2 to 20 millimeters, may constitute the shielding material 18. Such honeycomb material could be sprayed or dipped into lead or other high X-ray absorbing material, such as tin or zinc.

The X-ray image is produced on an X-ray screen system 12, or fluorescent screen, such that after the article has been removed from in front of the screen, the image is presented to a television camera system 15 for display and storage.

The arrangement of FIG. 2 illustrates a further embodiment of the X-ray system in which the longitudinal slot 4' for carrying articles is along the side of the cabinet.

The entrance and exit openings are arranged in the same side of the cabinet. In addition, a slide system 6 which has a triangular cross-section with the highest point being in the center is provided. In this manner, dropped items may be slide backward to the entrance slot, or slide forward to the exit slot, for removal from the apparatus. The center portion of the conveyer is just below the fluorescent screen so that all items transported through the X-ray chamber are seen on the fluorescent screen.

Figure 2A:
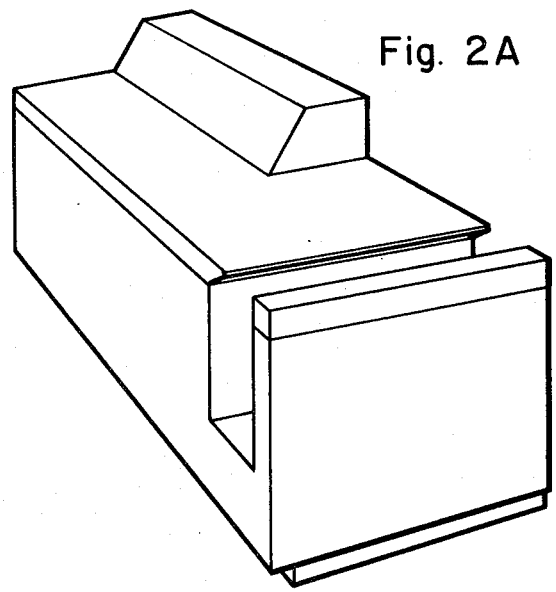
FIG. 2A is an illustration of a further arrangement of the X-ray assembly of FIG. 2.

FIG. 2A shows another arrangement of an X-ray cabinet where the entrance and exit openings are at the opposing side walls.

Figure 4:
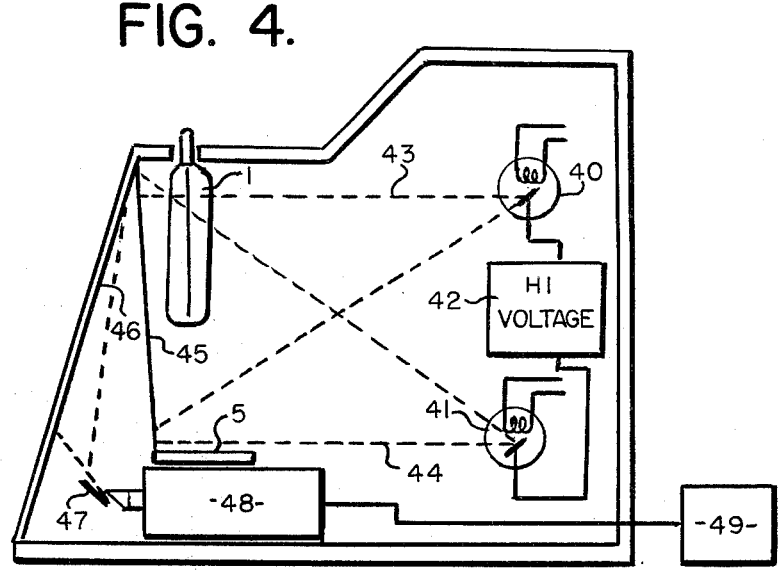
FIG. 4 illustrates an alternative embodiment of the X-ray assembly of the present invention wherein items carried on a conveyor system may be also inspected.

In addition, as illustrated in FIG. 4, an arrangement may be provided for obtaining an X-ray image of items carried on the conveyor system 5. Thus, a hand-held article is directly exposed to X-rays 43 from generator 40, while articles traveling on the conveyor system 5 are exposed to X-rays 44 from generator 41. The X-ray images are provided by the system 45, which may be a fluorescent screen. This image from the screen 45 is reflected by mirror 46 and reflective anisotropic, wide angle lens 47 into a TV pickup 48. Storage of the TV visual image, or direct display, may occur with system 49.

This arrangement allows articles to be imaged and viewed, both when hand-carried or placed on the conveyor system 5. Problems of limited images in either position, and particularly the conveyor system, are eliminated.

Integrated with the X-ray system is a metal detection arrangement as illustrated in FIG. 3. The metal detection structure includes an archway 20 placed about midway along the article handling slot so that individuals walking through are exposed to electromagnetic radiation for detecting metal carried on their persons. Any hand-carried articles' are transported within the cabinet 2, and are accordingly shielded from the metal detector 20. An alarm from the metal detector 20 will not be caused to sound from the hand-carried items 1. This permits people to carry their own briefcases, purses and etc. through the metal detector without having to relinquish control thereof.

The fundamental advantage of the present invention is that an individual can now approach a security station, walk through it, and exit without slowing down or having to release any articles that he is carrying. This allows a considerably faster throughput since no handling of the articles is required by external personnel, and the person only has to proceed in a straight line.

The metal detection structure of the present invention utilizes electromagnetic radiation which may be of a low frequency. For example, the electromagnetic radiation may have a frequency of around 500 Hertz and may also range up to 10-50 kiloHertz. An eddy current principle may be used. The detector sets up a pulsed signal, and then turns off to obtain a received image pulse.

Figure 5:
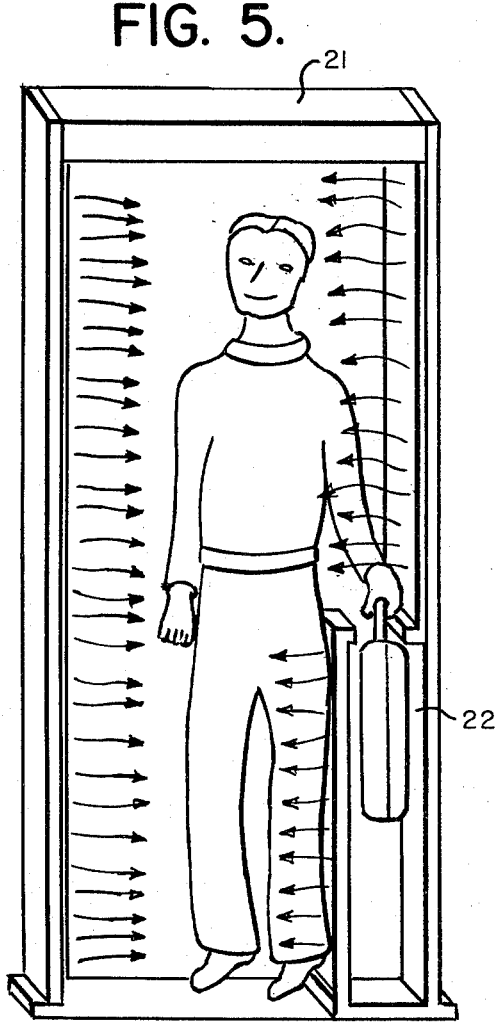
FIG. 5 illustrates one embodiment of the metal detection system in accordance with the present invention.

The structure of the metal detection system is further seen in FIG. 5 in which the X-ray system for inspecting the hand-held articles does not appear. In this arrangement, however, the person passing through the archway 21 for providing metal detection inserts any hand-held items into the longitudinal slot 23 so that the item passes through the protected opening 22 while he is being inspected by way of the metal detection arrangement 21. An alarm may be created when a metal object of a given size is detected on the person of the individual, such as by way of something in his pocket, or etc., but any metal objects in the hand-held article will not cause the alarm to sound.

Figure 6:
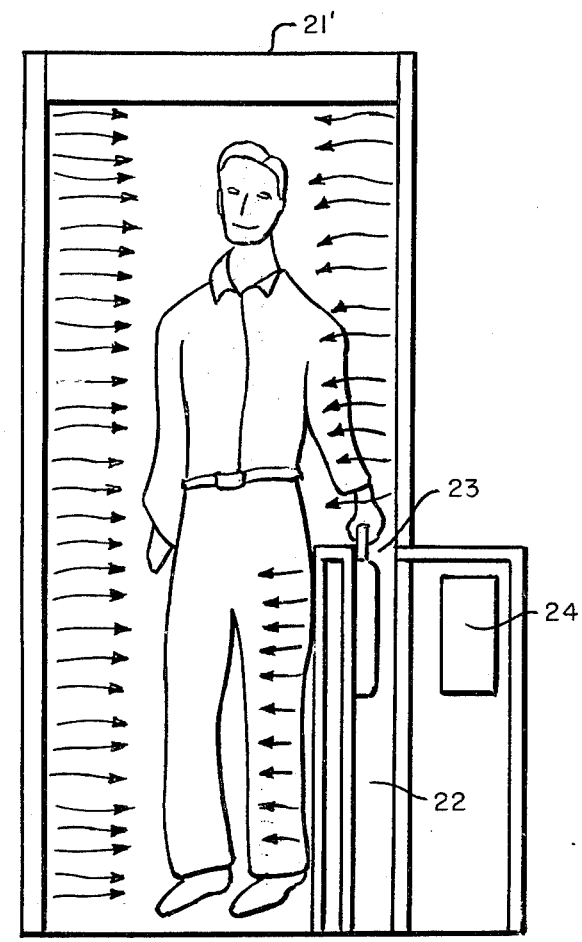
FIG. 6 illustrates a further embodiment of the metal detection arrangement of the present invention.

In the embodiment of FIG. 6, a modification is provided which is extremely useful in security arrangements of factories, for example, in which hand-held articles are placed in clear plastic bags and carried through the metal detection system. A video arrangement 24 views the hand held items in the system 22 while the person walks through the metal detection archway 21. In this manner, items in the plastic bags can be examined, and/or a video storage can be made for later viewing.

Figure 7:
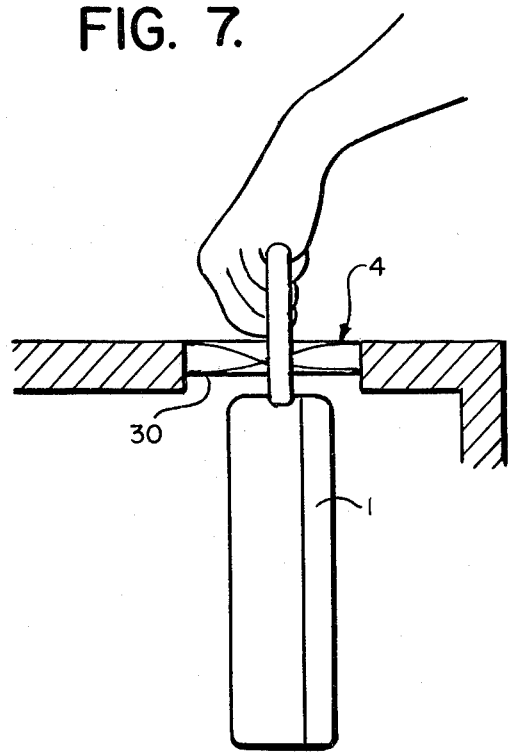
FIG. 7 illustrates an embodiment of the arrangement for hand-carrying items to be X-ray inspected.

In the arrangement for transporting hand-held articles through an X-ray system, an enclosed slot 4, such as shown in FIG. 7, is arranged in the X-ray system for passing the hand-held article. This slot is closed by way of fiber formed articles 30, as may be seen in FIG. 7. Such fibers may be formed with X-ray scattering materials such as lead, platinum, and/or gold, and may be arranged in several alternative arrangements. For example, the circular cross-section members 30 in FIGS. 8a and 8b may be provided wherein the members 30 extend from each side of the slot in overlapping relationship. On the other hand, as may be seen in FIG. 8c the slot filling material may be formed in a curved cross-section to form the cover members 41. This arrangement has a curvature so that the members 31 overlap one another from one to the next to exclude any straight line openings for X-ray scatter.

A similar arrangement may be seen in FIGS. 8d and 8e in which the fibers are formed in an S-shaped element 32 so as to provide overlap. A further arrangement of this X-ray absorbing material may be seen in FIG. 8f which cuts down significant amounts of the X-rays, even though certain of the X-rays may be passed between the fibers 33 in a given direction.

The arrangement of the present invention allows articles to be transported through the inspection system by the person himself. This arrangement allows complete radiation protection for the person inasmuch as the X-ray chamber 2 is completely shielded so as to produce less than 0.5 milliroentgens per hour scatter from a standard test object. The slot in which the item is passed is of such size to prevent persons from placing their wrists or arms into the X-ray chamber, and interlock systems are provided to prevent accidental penetration into the X-ray chamber.

Additionally, means (not shown) are provided for deactivating x-ray tube 10 upon insertion of fingers or a hand in the slot.

The X-ray system may operate by a photosensing arrangement in which a first photocell 17 senses the article direction and position as the article enters the X-ray chamber. This first photocell prepares the X-ray generator and video storage unit for the next exposure. A second photocell beam is then broken a short distance along the X-ray chamber so as to create a pulse of X-ray energy which freezes the X-ray image of the article on the fluorescent screen. A light amplifier and TV camera, such as 15, record the image for storage in a single frame magnetic disc for a television monitor display.

FIG. 9 illustrates another embodiment of the invention employing the X-ray absorption principle. The walk-through metal detector 52 is equivalent to that of the previous embodiments but the X-ray absorption cabinet 50 provides minimal X-ray shielding to the X-ray fan beam 53. The X-ray tube 54 produces a cone of radiation that is collimated by slits 55 into a fan beam. This beam passes through the article 56 being inspected and is sensed by a linear detector 57. The X-ray detector senses the X-ray attenuation by the article 56 and has an electronic analysis 58 to indicate when the absorption is large. The radiation shielding for the slot 51 is the same as previously described in FIG. 8.

This hand-transport security system concept can be used for other radiation devices besides imaging X-ray units. It can be employed with X-ray fluorescent detecting systems, and with X-ray absorption systems to examine the total X-ray absorption of the hand carried article. Microwaves and radio frequency devices also can be used for the screening mechanism of the hand carrier for articles. Thus, the hand transport cabinet provides a protection device whereby a person can hold his hand-held articles without injury in a normally injurious radiation field. The slot and radiation baffles prevent the radiation from escaping to cause injury to the individual.

What is claimed:

1. Apparatus for inspecting an article comprising a longitudinally extending cabinet having top and bottom walls, oppositely disposed side walls, and oppositely disposed end walls; a longitudinally extending slot-like opening in said cabinet adjacent a corresponding edge of said top wall and a side wall; an entrance opening at one portion of said cabinet and an exit opening at another portion of said cabinet, said entrance opening and said exit opening connecting with said longitudinal opening so that a hand-held suspended article can be passed in said cabinet by a person holding said article outside said cabinet; means arranged within said cabinet for generating sensing radiation in a direction transversely to movement of said hand-held article; and means for detecting said radiation after passage through said article and for recording resulting information.

2. Apparatus according to claim 1, wherein said sensing radiation-generating means comprises an X-ray generator, and said detecting means comprises an X-ray detector.

3. Apparatus according to claim 1 or 2, wherein said longitudinally extending slot-like opening is in said top wall of said cabinet, and said entrance opening and said exit opening are in said cabinet side wall adjoining said slot-like opening.

4. Apparatus according to claim 1 or 2, wherein said longitudinally extending slot-like opening is in said top wall of said cabinet, and said entrance opening and said exit opening are in said respective oppositely disposed cabinet side walls.

5. Apparatus according to claim 1 or 2, wherein said longitudinally extending slot-like opening is in said top wall of said cabinet, and said entrance opening and said exit opening are in said respective oppositely disposed cabinet end walls.

6. Apparatus according to claim 1 or 2, wherein said longitudinally extending slot-like opening is along one of said side walls adjacent to said corresponding edge, and said entrance opening and said exit opening are disposed in said one side wall.

7. Apparatus according to claim 1 or 2, wherein means are provided for preventing radiation leakage through each of said longitudinally extending slot-like opening, said entrance opening and said exit opening.

8. Apparatus according to claim 7, wherein said means for preventing radiation leakage include X-ray absorbing materials.

9. Apparatus according to claim 7, wherein an X-ray scattering barrier is provided on internal walls of said cabinet.

10. Apparatus according to claim 9, wherein said X-ray scattering barrier is also provided along said slot-like opening, said entrance opening and said exit opening.

11. Apparatus according to claim 1 or 2, wherein means are provided for internally shielding said walls of said cabinet from said sensing radiation.

12. Apparatus according to claim 11, wherein said shielding means include a honey comb material being at least one of aluminum, paper, or plastic having cells of the order of 2 to 20 mm.

13. Apparatus according to claim 1 or 2, wherein said means for detecting include fluorscopic means for providing a visible image of said hand-held article.

14. Apparatus according to claim 13, wherein said means for recording include means for storing said resulting information and means for viewing said resulting information.

15. Apparatus according to claim 1 or 2, wherein said means for detecting includes means for measuring X-ray absorption of said hand-held article.

16. Apparatus according to claim 1 or 2, wherein said means for recording include means for storing said resulting information and means for viewing said resulting information.

17. Apparatus according to claim 1 or 2, wherein said means for detecting include electrophoretic means for providing a visible image of said hand-held article.

18. Apparatus according to claim 17, wherein said means for recording include means for storing said resulting information and means for viewing said resulting information.

19. Apparatus according to claim 1 or 2, wherein means are provided for activating said radiation generating means only when said hand-held article is in a predetermined position along said longitudinally extending slot-like opening.

20. Apparatus according to claim 19, wherein said activating means include at least one photocell structure.

21. Apparatus according to claim 1 or 2, wherein said longitudinally extending slot-like opening has a width opening with a predetermined size small enough to prevent insertion of human appendages.

22. Apparatus according to claim 1 or 2, wherein means are provided in said cabinet for conveying articles below said longitudinally extending slot-like opening from said entrance opening to said exit opening.

23. Apparatus according to claim 22, wherein means are provided for generating sensing radiation transversely to said conveying means.

24. Apparatus according to claims 1 or 2, wherein an X-ray scattering barrier is provided on internal walls of said cabinet.

25. Apparatus according to claim 24, wherein said X-ray scattering barrier is also provided along said slot-like opening, said entrance opening and said exit opening.

26. Apparatus according to claim 1 or 2, wherein means are provided adjacent said cabinet for independently carrying out a predetermined metal detection of persons carrying said hand-held articles.

* * * * *